(12) United States Patent
Küstner et al.

(10) Patent No.: US 7,231,352 B2
(45) Date of Patent: Jun. 12, 2007

(54) METHOD FOR COMPUTER-SUPPORTED SPEECH RECOGNITION, SPEECH RECOGNITION SYSTEM AND CONTROL DEVICE FOR CONTROLLING A TECHNICAL SYSTEM AND TELECOMMUNICATIONS DEVICE

(75) Inventors: Michael Küstner, Weyarn (DE); Ralf Sambeth, München (DE)

(73) Assignee: Infineon Technologies AG (DE)

( * ) Notice: Subject to any disclaimer, the term of this patent is extended or adjusted under 35 U.S.C. 154(b) by 813 days.

(21) Appl. No.: 10/663,966

(22) Filed: Sep. 16, 2003

(65) Prior Publication Data

US 2004/0102974 A1    May 27, 2004

(30) Foreign Application Priority Data

Sep. 23, 2002    (DE) ............... 102 44 165

(51) Int. Cl.
  *G10L 15/14* (2006.01)
(52) U.S. Cl. .................. 704/256; 704/257
(58) Field of Classification Search ............... 704/256, 704/257
  See application file for complete search history.

(56) References Cited

U.S. PATENT DOCUMENTS 6,253,173 B1 *    6/2001 Ma .................. 704/222
6,801,892 B2 *    10/2004 Yamamoto ............ 704/256

OTHER PUBLICATIONS

Haeb-Umback R. et al., "Improvements in connected digit recognition using linear discriminant analysis and mixture densities." In Proceedings of the International Conference on Acoustics, Speech, and Signal Processing (ICASSP), pp. II-239-242, New York, IEEE, U.S., Apr. 27, 2003.
Hubener K. et al., "Speech recognition for spontaneously spoken German dialogues." In Spoken Language, 1996. ICSLP 96. Proceedings, Fourth International Conference on Spoken Language, Philadelphia, PA, pp. 212-215, Oct. 3-6, 1996.
Dolfgang J.G.A. et al., "Signal representations for hidden Markov model based on line handwriting recognition." In Acoustics, Speech, and Signal Processing, 1997, pp. 3385-3388. IEEE International Conference in Munich Germany, Apr. 21-24, 1997, IEEE Comput. Soc., Los Alamitos, CA, USA, Apr. 21, 1997.

* cited by examiner

*Primary Examiner*—Daniel Abebe
(74) *Attorney, Agent, or Firm*—Jeffrey R. Stone; Altera Law Group, LLC

(57) ABSTRACT

The speech recognition rate which is necessary is determined for a selected speech recognition application. The information content of the feature vector components which is at least necessary to ensure the speech recognition rate is determined using a stored speech recognition rate information. The number of necessary feature vector components which is necessary to make available the determined information content is determined and the speech recognition is carried out using feature vectors with the determined required number of feature vector components.

9 Claims, 5 Drawing Sheets

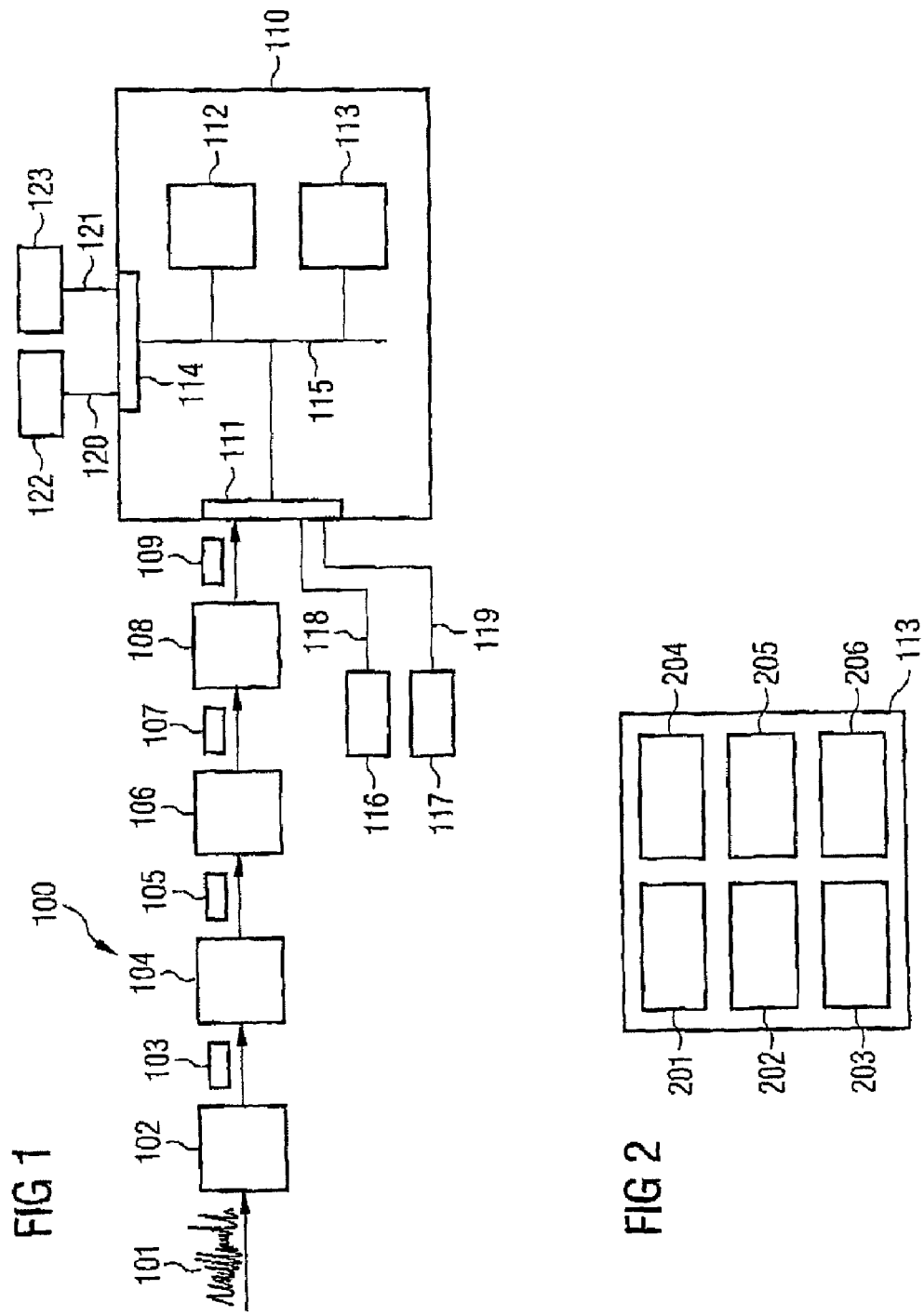

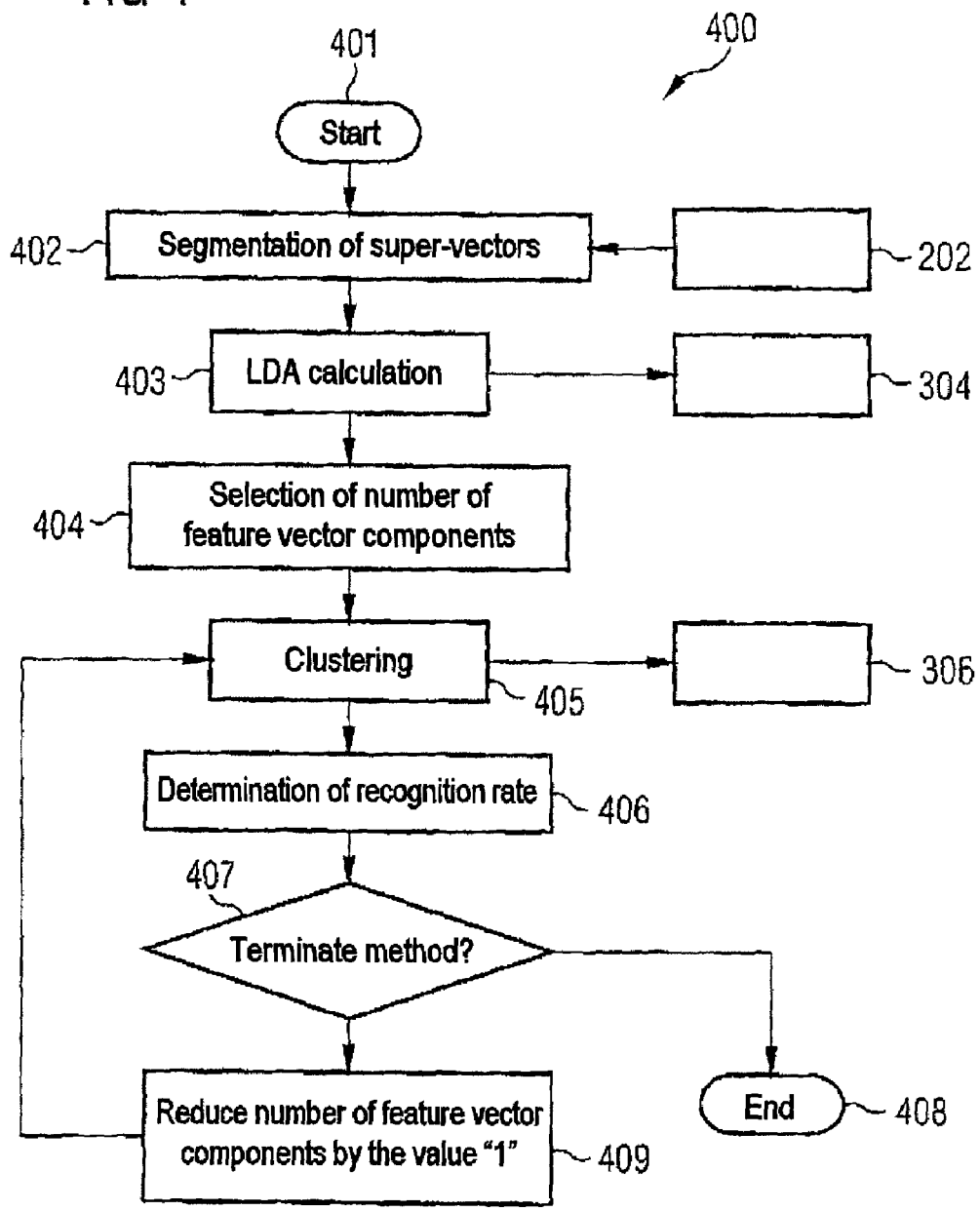

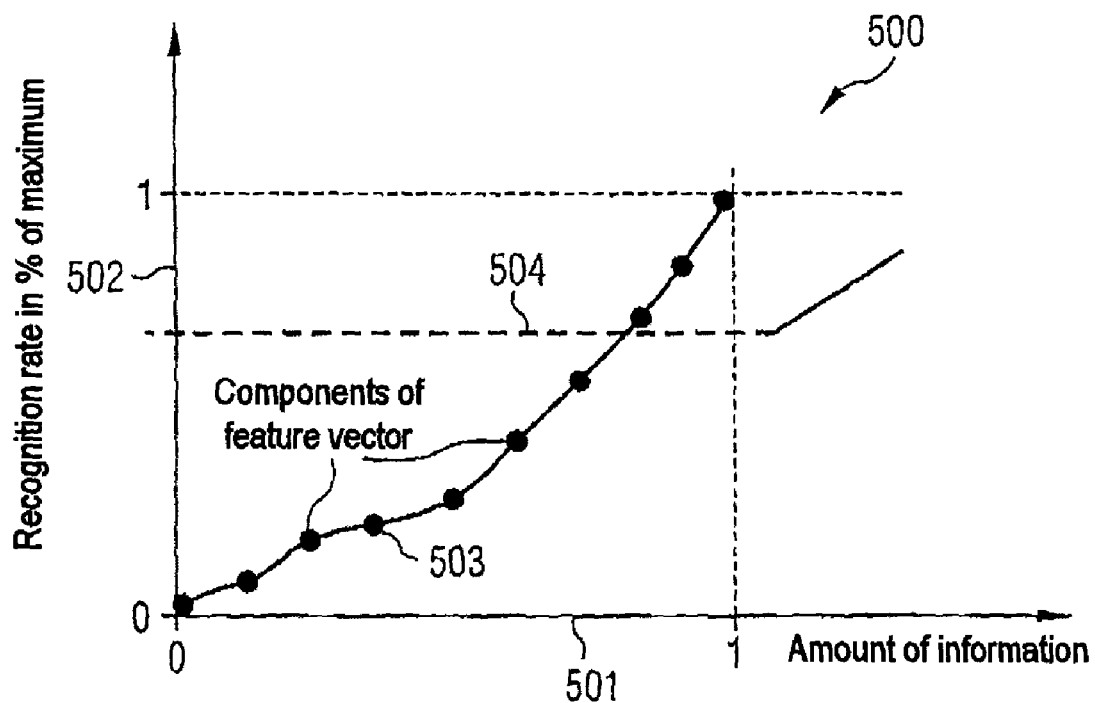

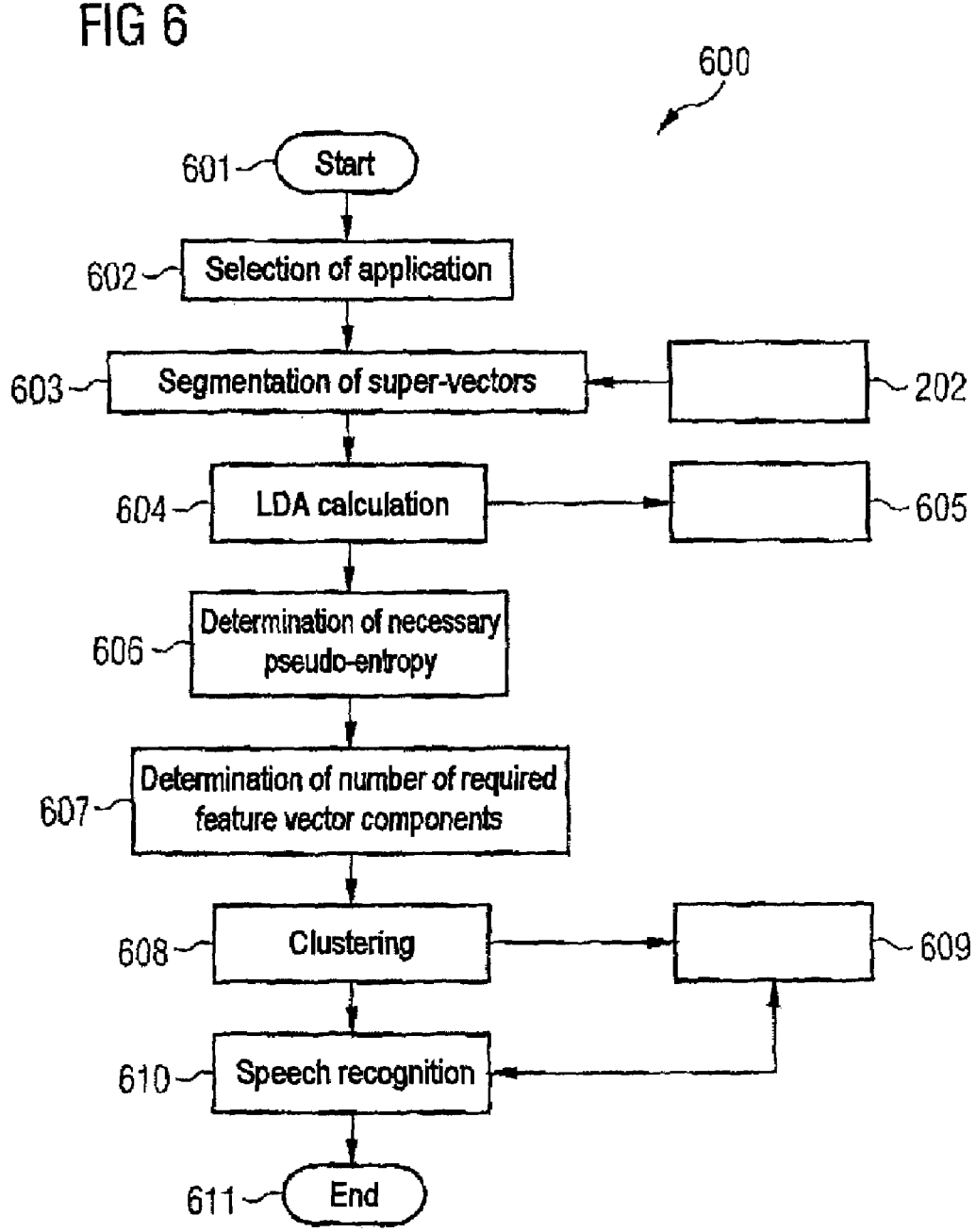

METHOD FOR COMPUTER-SUPPORTED SPEECH RECOGNITION, SPEECH RECOGNITION SYSTEM AND CONTROL DEVICE FOR CONTROLLING A TECHNICAL SYSTEM AND TELECOMMUNICATIONS DEVICE

BACKGROUND OF THE INVENTION

1. Field of the Invention

The invention relates to a method for computer-supported speech recognition, a speech recognition system and a control device for controlling a technical system with a speech recognition system and a telecommunications device.

Within the framework of computer-supported speech recognition, a speech signal which is spoken in by a user is digitized within the framework of pre-processing and mapped onto what are referred to as feature vectors and stored for the speech recognition which is to be carried out.

The feature vectors have, depending on the application, a permanently predefined number of feature vector components which are usually ordered in the feature vector according to their significance within the framework of the speech recognition, usually ordered according to feature vector components with a decreasing information content (statistical variance become smaller).

However, in particular, in a speech recognition application in an embedded system, the computing power which is available and the storage space which is available are limited, for which reason in the currently known speech recognition applications there are frequently problems, in particular owing to a very high number of feature vector components.

2. Description of the Related Prior Art

[1] describes a method for calculating distances between a feature vector and a plurality of comparison vectors. In this method, the discrimination capability is determined for each of the components of the feature vector. For those components of the feature vector whose discrimination capability is worse than a predefined threshold value, a first part distance from a group of components of the comparison vectors is determined. For those components of the feature vector whose discrimination capability is better than the predefined threshold value, second part distances from the corresponding components of the comparison vectors are determined. The distances between the feature vector and the plurality of comparison vectors is determined from the first part distance and the second part distances.

BRIEF SUMMARY OF THE INVENTION

The invention is based on the problem of specifying a possibility for computer-supported speech recognition, and a speech recognition system, in which a reduced available computing power or a reduced available storage space is sufficient.

The problem is solved by the method for computer-supported speech recognition, by the speech-recognition system, by the control device and by the telecommunications device with the features according to the independent patent claims.

In a method for computer-supported speech recognition using feature vectors, a recognition rate information which is preferably determined at the start of the method is stored, said recognition rate information specifying for the feature vectors, as a function of the information content of the feature vector components, which speech recognition rate can respectively be achieved with the feature vectors with the feature vector components which are respectively taken into account.

In a first step, the speech recognition rate which is required for the respective speech recognition application is determined for a speech recognition application.

Using the stored speech recognition rate information, the computer determines which information content of the feature vector components is at least necessary to ensure the specific speech recognition rate.

In addition, the number of feature vector components which are necessary in the speech recognition system for the respective speech recognition application in order to make available the determined information content is determined.

In addition, a code book is preferably generated for the respective speech recognition application, taking into account the previously determined number of feature vector components in the speech recognition system.

Then, preferably using the particular speech-recognition-application-specific code book, the speech recognition is carried out using feature vectors with the number of feature vector components which is necessary to make available the determined information content.

The speech recognition, that is to say the method for comparing the feature vectors, and thus in particular the comparison of the feature vectors of the spoken speech signal with the feature vectors of reference words which are stored in an electronic dictionary, is carried out using feature vectors with the number of feature vector components which is necessary to ensure the previously determined speech recognition rate.

A speech recognition system has a speech recognition unit and an electronic dictionary which is connected to the speech recognition unit and in which the words which are taken into account within the framework of the speech recognition are stored.

In addition, a recognition rate information memory in which recognition rate information is stored which specifies for the feature vectors, as a function of the information content of the feature vector components, which speech recognition rate can respectively be achieved with the feature vectors with the feature vector components which are respectively taken into account is provided in the speech recognition system. Before the actual speech recognition is carried out, the recognition rate information is determined, preferably with reference to a training data record, by means of a recognition rate information determining unit—which is also provided—in order to determine the recognition rate information. In addition, an information content determining unit is provided for determining the information content for feature vector components of a feature vector in the speech recognition system. In addition, a feature-vector-component selection unit is provided in the speech recognition system for the purpose of selecting feature vector components which are to be taken into account within the framework of the speech recognition.

A control device for controlling a technical system has the speech recognition system described above, the control instructions which are provided for controlling the technical system for the purpose of, preferably speaker-independent, speech recognition being stored in the electronic dictionary.

It is thus apparent that the invention makes it possible for the first time to take into account the actual application-specific requirements spoken for the recognition rate within the scope of the selection of feature vector components of feature vectors for speech recognition in a flexible way without a speech recognition rate having to be newly determined for each speech recognition application.

In this way, an optimized compromise is achieved, in particular in terms of the available storage space requirement by means of application-dependent reduction of the dimension of the feature vectors, or in other words the number of feature vector components which are taken into account. The reduction in the number of feature vector components which are taken into account within the scope of the speech recognition leads to a considerable reduction in the computer power required within the scope of the speech recognition itself.

For this reason, the invention is particularly suitable for use in an embedded system.

In addition, a considerable saving is achieved in terms of required computing time as, for a new speech recognition application, only the number of necessary feature vector components from the recognition rate information which has previously been acquired only once need be determined and the code book can be acquired directly by using the feature vectors with the determined necessary number of feature vector components.

Preferred developments of the invention emerge from the dependent claims.

The refinements of the invention which are described below relate to the method, the speech recognition system and the control device.

For the speech recognition itself, preferably a speech recognition method is carried out for speaker-independent speech recognition, particularly preferably using Hidden Markov Models.

Alternatively, statistical classifiers, for example using artificial neural networks, can be used for speech recognition, in particular for speaker-independent speech recognition.

However, according to the invention, any desired method can generally be used for speech recognition.

According to another refinement of the invention, there is provision for the feature vector components to be selected with relatively high information content from among the feature vector components of the respective feature vector and used within the scope of the speech recognition.

This refinement of the invention ensures that actually those feature vector components which have the smallest information content within all the feature vector components are not taken into account, ensuring that the information which is lost within the scope of the speech recognition process which comes about owing to the fact that the feature vector component is not taken into account is minimized.

A control device for controlling a telecommunications device, for example a telephone device, a telefax device, a PDA, a notebook etc., or for controlling a terminal in which at least two of the device functionalities described above are integrated in a common device, is suitable as a control device for controlling a technical system. In particular, these devices which are to be controlled with a clearly defined and a limited vocabulary can be controlled by means of a speech dialogue which can be implemented in a relatively clearly organized way, and thus cost-effectively even by means of an embedded system.

The application-adapted considerable reduction in the dimension of processed feature vectors leads to a considerable saving in time within the scope of the development of a speech recognition system, in particular the code book which is used is reduced considerably, which also reduces the storage space requirement to a considerable degree.

BRIEF DESCRIPTION OF THE DRAWINGS

An exemplary embodiment of the invention will be illustrated in the figures and will be explained below in more detail. In the drawings:

FIG. 1 shows a block diagram of a speech recognition system according to an exemplary embodiment of the invention;

FIG. 2 shows an outline of the memory of the computer from FIG. 1 in detail;

FIG. 4 shows a flowchart in which the individual method steps for determining a recognition rate information according to an exemplary embodiment of the invention are illustrated;

FIG. 5 shows an outline of a recognition rate information according to an exemplary embodiment of the invention; and FIG. 6 shows a flowchart in which the individual method steps of the method for speech recognition are illustrated in accordance with an exemplary embodiment of the invention.

DETAILED DESCRIPTION OF THE INVENTION

Figure 3:
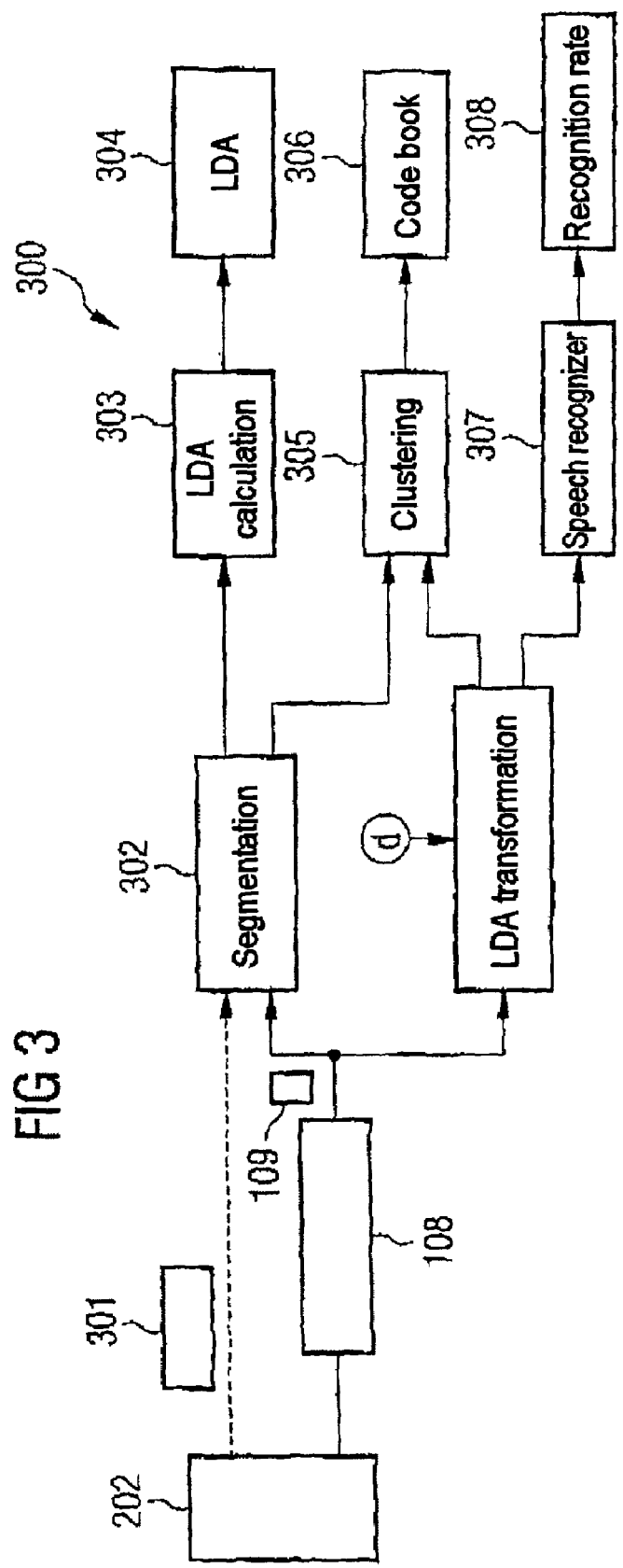
FIG. 3 shows a block diagram in which the individual method steps for determining a recognition rate information are illustrated in accordance with an exemplary embodiment of the invention.

The speech recognition system 100 operates, depending on the operating mode, in a first operating mode as a speech recognition device, a spoken in utterance 101 which is spoken in the speech recognition mode by a user (not illustrated) of the speech recognition system 100 being recognized by the speech recognition device. The speech recognition is carried out using a method for speaker-independent speech recognition.

In a second operating mode, also referred to below as training mode, the speech recognition system 100 is trained using an utterance 101, as explained in more detail below, and according to this exemplary embodiment this means that individual Hidden Markov Models are trained for an utterance by means of the utterance 101 spoken in.

In both operating modes, the speech signal 101 which is uttered by the user is fed to a microphone 102 and subjected as a recorded electrical analog signal 103 to pre-amplification by means of pre-amplification unit 104 and fed as an amplified analog signal 105 to an analog/digital converter 106, converted therein to a digital signal 107 and fed as a digital signal 107 to a feature extraction unit 108 which subjects the digital signal 107 to spectral transformation and forms a sequence of feature vectors 109 with respect to the digital signal 107 for an utterance, said feature vectors 109 representing the digital signal 107.

Each feature vector 109 has a predefined number of feature vector components.

According to this exemplary embodiment, the feature vectors each have 78 feature vector components.

The feature vectors 109 are fed to a computer 110.

It is to be noted in this context that the microphone 102, the pre-amplification unit 104, in particular the amplification unit, and the analog/digital converter 106 as well as the feature extraction unit 108 can be implemented as separate units or else as units which are integrated in the computer 110.

According to this exemplary embodiment of the invention there is provision for the feature vectors 109 to be fed to the computer 110 via its input interface 111.

The computer 110 also has a microprocessor 112, a memory 113 and an output interface 114, which are all connected to one another by means of a computer bus 115.

The method steps which are described below, in particular the methods for determining the recognition rate information which is explained below and the speech recognition methods are carried out by means of the microprocessor 112.

An electronic dictionary (explained in more detail below) which is stored in the memory 113, contains the entries in the form of trained Hidden Markov Models which are contained within the framework of the speech recognition process as reference words which only can be recognized, if at all, by the speech recognition algorithm.

Alternatively, a digital signal processor may also be provided which has implemented the respectively used speech recognition algorithms and can have a microcontroller specialized therefor.

In addition, the computer 110 is connected by means of the input interface 113 to a keyboard 116 and a computer mouse 117 via electrical leads 118, 119 or a radio link, for example an infrared link or a Bluetooth link.

The computer 110 is connected to a loudspeaker 122 and to an actuator 123 by means of the output interface 114 via additional cables or radio links, for example by means of an infrared link or a Bluetooth link 120, 121.

The actuator 123 in FIG. 1 represents generally any possible actuator within the scope of the control of a technical system, implemented for example in the form of a hardware switch or in the form of a computer program in case, for example, a telecommunications device or another technical system, for example a car radio, a stereo system, a video recorder, a television, the computer 110 itself or some other technical system is to be controlled.

According to the exemplary embodiment of the invention, the feature extraction unit 108 has a bank of filters with a plurality of bandpass filters which measure the energy of the input speech signal 103 in the individual frequency bands. So-called short-term spectra are formed by means of the bank of filters by rectifying the output signals of the bandpass filters, smoothing them and sampling them at short intervals, according to the exemplary embodiment every 10 msec, or alternatively every 15 msec.

The Cepstrum coefficients which are formed by means of the feature extraction unit 108 and which form 13 coefficients of the feature vectors 109 are stored as feature vector components of two successive time windows with a size of 10 msec or 15 msec in the feature vector 109. In addition, as feature vector component in the feature vector 109, in each case the first time derivative and the second time derivative of the Cepstrum Coefficients are combined in the feature vector 109 as super feature vector and fed to the computer 110.

In the computer 110, a speech recognition unit is implemented in the form of a computer program and stored in a first memory area 201 (see FIG. 2) in the memory 113, which speech recognition unit is based on the principle of Hidden Markov Models. The computer program is thus used to perform speaker-independent speech recognition.

At the start of the method, two different data records are formed with utterances which are spoken in by one or more users.

A training data record, stored in a second memory area 202 of the memory 113 has those utterances, in the form of feature vectors for the respective utterances, which are used for the training (described in more detail below) of the Hidden Markov Models which are used for speech recognition.

In a third memory area 203, a test data record, that is to say the utterances which are used for testing the trained speech recognition unit, in other words for testing the trained Hidden Markov Models which are stored in a fourth memory area 204, is stored.

A recognition rate information which is stored in a fifth memory area 205 is determined by means of the test data record, as explained in more detail below.

In a sixth memory area 206, a table which is explained in more detail below and in which for one or more applications of the speech recognition system an indication of which recognition rate is required for the respective application is stored.

In this context it is pointed out that the individual elements can be stored in different memory areas of the same memory 113, but also in different memories which are preferably adapted to the respective demands of the stored elements.

FIG. 3 and FIG. 4 show, in a block diagram 300 (cf. FIG. 3) or in a flowchart (cf. FIG. 4), the individual method steps which are carried out by the computer 110 in order to determine the recognition rate information stored in the fifth memory area 205.

After the method starts (step 401), the individual Hidden Markov Models are trained in a training step using the training data record stored in the second memory area 202.

The Hidden Markov Models are trained in accordance with this exemplary embodiment in three phases:

a first phase (step 402) in which the speech signals 301 contained in the training database are segmented by means of a segmentation unit 302, a second phase (step 403) in which the LDA matrix (linear discriminance analysis matrix) is calculated, and a third phase (step 405) in which the code book, that is to say the HMM prototype feature vectors are calculated for in each case one number of feature vector components, which number is selected in a selection step (step 404).

These three phases are referred to in their entirety below as the training of the Hidden Markov Models (HMM training).

The HMM training is carried out using the DSP 123 as well as using predefined training scripts, clearly of suitably designed computer programs.

According to this exemplary embodiment, each phonetic unit which is formed, that is to say each phoneme, is divided into three successive phoneme segments, corresponding to an initial phase (first phoneme segment), a central phase (second phoneme segment) and an end phase (third phoneme segment) of a sound, that is to say of a phoneme.

In other words, each sound is modeled in a sound model with three states, that is to say with a three-state HMM.

During the speech recognition, the three phoneme segments are arranged in a row in a Bakis topology or generally a left-right topology and the calculation is carried out within the framework of speaker independent speech recognition on the concatenation of these three segments arranged in a row.

As will be explained in more detail below, a Viterbi algorithm is carried out in the speech recognition mode in order to decode the feature vectors which are formed from the speech signal 101 which is input.

After segmentation has taken place, the LDA matrix 304 (step 403) is determined by means of an LDA matrix calculation unit 303.

The LDA matrix 304 is used to transform a respective super feature vector y into a feature vector x according to the following rule:

$$x = \underline{A}^T \cdot (\underline{y} - \underline{\bar{y}}) \quad (1)$$

where
$\underline{x}$ is a feature vector,
$\underline{A}$ is an LDA matrix,
$\underline{y}$ is a super feature vector
$\underline{\bar{y}}$ is a global displacement vector.

The LDA matrix $\underline{A}$ is determined in such a way that
the components of the feature vector $\underline{x}$ are essentially uncorrelated to one another in the statistical average,
the statistical variances within one segment class are normalized by the statistical average,
the centers of the segment classes on the statistical average are at a maximum distance from one another, and
the dimension of the feature vectors x is reduced as far as possible, preferably as a function of the speech recognition application.

The method for determining the LDA matrix $\underline{A}$ is explained below with reference to these exemplary embodiments.

However, it is to be noted that alternatively all known methods for determining an LDA matrix $\underline{A}$ can be used without restriction.

It is assumed that there are J segment classes, each segment class j containing a set of $D_y$-dimensional super feature vectors $\underline{y}$, that is to say the following applies:

$$\text{Class } j = \{\underline{y}_j^1, \underline{y}_j^2, \ldots, \underline{y}_j^{N_j}\}, \quad (2)$$

$N_j$ being the number of super feature vectors $\underline{y}_j$ in the class j.

$$N = \sum_{j=1}^{J} N_j \quad (3)$$

designates the total of super feature vectors $\underline{y}$.

It is to be noted that the super feature vectors $\underline{y}_j^k$ has been determined using the above-described segmentation of the speech signal database.

According to this exemplary embodiment, each super feature vector $\underline{y}_j^k$ has a dimension $D_y$ of $$D_y = 78 (= 2 \cdot 3 \cdot 13)$$

the super feature vector $\underline{y}_j^k$ containing 13 MFCC coefficients (Cepstrum coefficients) as well as their respective first time derivative and their respective second time derivative (this is the reason for factor 3 above).

In addition, in each case the components of two time windows which follow one another in direct temporal succession are contained in each super feature vector $\underline{y}_j^k$ within the framework of the short-time analysis (this is the reason for factor 2 above).

It is to be noted in this context that basically any desired number of vector components which are adapted to the respective application can be contained in the super feature vector $\underline{y}_j^k$, for example up to 20 Cepstrum coefficients and their associated first time derivatives and second time derivates.

The statistical average, or in other words the center of class j, is obtained according to the following rule:

$$\underline{\bar{y}}_j = \frac{1}{N_j} \cdot \sum_{i=1}^{N_j} \underline{y}_j^i. \quad (4)$$

The covariance matrix $\underline{\Sigma}_j$ of class j is obtained according to the following rule:

$$\sum_j = \frac{1}{N_j} \cdot \sum_{i=1}^{N_j} (\underline{y}_j^i - \underline{\bar{y}}_j) \cdot (\underline{y}_j^i - \underline{\bar{y}}_j)^T. \quad (5)$$

The average intra scatter matrix $\underline{S}_w$ is defined as:

$$\underline{S}_w = \sum_{j=1}^{J} p(j) \cdot \sum_j, \quad (6)$$

where $$p(j) = \frac{N_j}{N}, \quad (7)$$

p(j) being referred to as a weighting factor of the class j.
Analogously, the average inter scatter matrix $\underline{S}_b$ is defined as:

$$\underline{S}_b = \sum_{j=1}^{J} p(j) \cdot (\underline{\bar{y}}_j - \underline{\bar{y}}) \cdot (\underline{\bar{y}}_j - \underline{\bar{y}})^T, \quad (8)$$

where $$\underline{\bar{y}} = \sum_{j=1}^{J} p(j) \cdot \underline{\bar{y}}_j \quad (9)$$

as the average super feature vector of all the classes.

The LDA matrix $\underline{A}$ is decomposed according to the following rule:

$$A = \underline{U} \cdot \underline{W} \cdot \underline{V}$$

$\underline{U}$ designating a first transformation matrix,
$\underline{W}$ designating a second transformation matrix and
$\underline{V}$ designating a third transformation matrix.

The first transformation matrix $\underline{U}$ is used to diagonalize the average intra scatter matrix $\underline{S}_w$ and is determined by transforming the positively definite and symmetrical average intra scatter matrix $\underline{S}_w$ into its own vector space. In its own vector space, the average intra scatter matrix $\underline{S}_w$ is a diagonal matrix whose components are positive and greater than or equal to zero. The components whose values are greater than zero correspond to the average variance in the respective dimension which is defined by the corresponding vector component.

The second transformation matrix $\underline{W}$ is used to normalize the average variances and is determined according to the following rule:

$$\underline{W} = (\underline{U}^T \cdot \underline{S}_W \cdot \underline{U})^{-\frac{1}{2}}. \tag{11}$$

The transformation $\underline{U} \cdot \underline{W}$ is also referred to as a Weiss transformation.

$$\underline{B} = \underline{U} \cdot \underline{W} \tag{12}$$

yields the unit matrix for the matrix $\underline{B}^T \cdot \underline{S}_w \cdot \underline{B}$, said matrix remaining unchanged during any orthonormal linear transformation.

In order to diagonalize the average inter scatter matrix $\underline{S}_b$, the third transformation matrix $\underline{V}$, which is formed according to the following rule:

$$\underline{V} = \underline{B}^T \cdot \underline{S}_b \cdot \underline{B}. \tag{13}$$

$\underline{B}^T \cdot \underline{S}_b \cdot \underline{B}$ also representing a positive definite and symmetrical matrix, is transformed into its own vector space.

In the transformation space $$\underline{x} = \underline{A}^T \cdot (\underline{y} - \overline{\underline{y}}) \tag{14}$$

the following matrices are thus obtained:

A diagonalized average intra scatter matrix $\underline{S}_w$:

$$\underline{S}_w = \text{diag}(\underline{1})_{d=1 \ldots D_y} \tag{15}$$

and a diagonalized average inter scatter matrix $\underline{S}_b$:

$$\underline{S}_b = \text{diag}(\sigma_d^2)_{d=1 \ldots D_y'} \tag{16}$$

$\text{diag}(c_d)_{d=1 \ldots D_y}$ designating a $D_y \times D_y$ diagonal matrix with the component $c_d$ in the row/column d and otherwise with components with the value zero.

The values $\sigma_d^2$ are the eigenvalues of the average inter scatter matrix $\underline{S}_b$ and represent a measure of the so-called pseudo-entropy of the feature vector components, which pseudo-entropy is also referred to as information content of the feature vector components. It is to be noted that the track of each matrix is invariant with respect to any orthogonal transformation, as a result of which the sum $$\sigma^2 = \sum_{d=1}^{D_y} \sigma_d^2 \tag{17}$$

represents the total average variance of the average vector $\underline{x}_j$ of the J classes.

This thus results in a determined dependence of the pseudo-entropy of the feature vectors from the feature vector components which are contained or taken into account respectively in the feature vector.

According to this exemplary embodiment, a dimension reduction is then performed by sorting the $\sigma_d^2$ values into an order such that they decrease in size and the $\sigma_d^2$ values which are smaller than a predefined threshold value are omitted, that is to say not taken into consideration.

The predefined threshold value can also be defined cumulatively.

The LDA matrix $\underline{A}$ can then be adapted by sorting the rows in accordance with the eigenvalues $\sigma_d^2$ and omitting the rows which are associated with the sufficiently "small" variances, and thus only have a small information content (small pseudo-entropy).

According to this exemplary embodiment, the components with the 24 largest eigenvalues $\sigma_d^2$ are used, in other words $$D_x = 24.$$

The four partial steps described above for determining the LDA matrix $\underline{A}$ 304 (step 403) are summarized in the following table:

| Number of method step | Aim | Method |
|---|---|---|
| 1 | Decorrelation of the feature vector components | Diagonalization of average intra class covariance matrix $\underline{S}_w$ |
| 2 | Normalization of the statistical variances within a class | Determination of inverse square root of the transformed average intra class covariance matrix $\underline{U}^T \cdot \underline{S}_W \cdot \underline{U}$ |
| 3 | Maximization of class centers | Diagonalization of transformed average inter class covariance matrix $\underline{B}^T \cdot \underline{S}_b \cdot \underline{B}$ |
| 4 | Reduction of dimensions of the feature vectors | Selection of rows of the matrix $\underline{A}$ with the 24 largest intrinsic values of $\underline{A}^T \cdot \underline{S}_b \cdot \underline{A}$ |

The last method relating to the part method within the framework of the training of the Hidden Markov Models is the clustering of the feature vectors (step 405) which is carried out by means of a cluster unit 305 and which has, as a result, a respective code book 306, in each case specifically for a training data record with a predefined number of feature vector components.

The representatives of the segment classes are referred to in their entirety as the code book and the representatives themselves are also referred to as prototypes of the phoneme segment classes.

The prototypes, also referred to below as prototype feature vectors, are determined according to the Baum-Welch training described in [1].

Thus the basic entries of the electronic dictionary, that is to say the basic entries for speaker-independent speech recognition, are generated and stored and the corresponding Hidden Markov Models are trained.

There is thus in each case a Hidden Markov Model for each basic entry, by which means the code book 306 for the training data record with the selected number of feature vector components in the feature vectors in the training data record is formed.

After the training of the Hidden Markov Models has taken place, the trained Hidden Markov Models are then present in the fourth memory area 204.

In a subsequent method step (step 406), the recognition rate for the respective feature vectors of the current dimension, that is to say for the feature vectors with the respectively current number of feature vector components, is determined for those in the test data record which is stored in the third memory area 203.

This is carried out in accordance with this exemplary embodiment in that, for all utterances, that is to say for all the sequences of feature vectors in the test data record, speech recognition is carried out by means of the trained Hidden Markov Models, in other words by means of a speech recognition unit 307, and the speech recognition results are compared with the setpoint results of the test data record.

The recognition rate 308 which is determined is obtained from the ratio of the number of correct recognition results, in other words from the number of correspondences between the speech recognition result and the setpoint result which is specified in the test data record, and from the test data records which are represented in their entirety for speech recognition.

In a following step (step 304), the determined recognition rate is stored together with the specification of how many feature vector components are being used to determine the recognition rate 308 for the feature vectors of the test data records 203.

Then, in a test step 407, it is checked whether the method is to be terminated.

If this is the case, the method is terminated (step 408).

If the method is not yet to be terminated, the number of feature vector components of the feature vectors 109 which are used within the framework of the determination of the recognition rate from the test data record are reduced by a predefined value, preferably by the value "1", that is to say by one feature vector component (step 409).

The clustering steps (step 405), and thus the steps for the creation of the respective code book 306 and for determining the speech recognition rate (step 406) are then carried out anew, but now for feature vectors of the test data record with the feature vectors which are in each case reduced by one feature vector component.

In other words this means that if there are 78 feature vector components in a usual feature vector according to this exemplary embodiment of the invention in the second iteration, the recognition rate for a feature vector is carried out with 77 feature vector components, with 76 feature vector components in the third iteration, etc.

According to one alternative refinement of the invention there is provision that the process is not started immediately with all the feature vector components of the super feature vector (i.e. not with all 78 feature vector components), but rather a number of feature vector components which is reduced by an application-dependent value as early as at the start.

In addition, in each iteration, the number of feature vector components can be reduced by more than the value "1".

Thus, as a result of this method described above, a pseudo-entropy mapping is present on the one hand, and a recognition rate mapping, on the other.

The pseudo-entropy mapping is used to specify a dependence of the pseudo-entropy of the feature vectors on the feature vector components which are taken into account, that is to say dependence of the information content, also referred to as quantity of information, on the feature vector components which are taken into account.

A dependence of the speech recognition rate of the feature vectors on the feature vector components which are taken into account is specified with the recognition rate mapping.

The recognition rate information is formed from the pseudo-entropy mapping and the recognition rate mapping by determining a dependence of the speech recognition rate on the pseudo-entropy using the respective feature vector components taken into account. It is to be noted that the recognition rate information is now independent of the number of feature vector components taken into account.

The recognition rate information is stored in the fifth memory area 205.

The result of this method is thus the recognition rate information 500 which is represented in a functional diagram in FIG. 5 and which specifies the recognition rate 502 reached in the form of data tuples 503 on a first axis on which the determined pseudo-entropy 501 is plotted.

The recognition rate information 500 thus represents the relationship between the pseudo-entropy and the recognition rate which can be achieved by means of the speech recognition system.

In this context it is pointed out that the recognition rate information 500 has to be carried out only once for each speech recognition system, that is to say for each trained set of Hidden Markov Models.

FIG. 6 shows, in a flowchart 600, the individual method steps for the speech recognition method according to the exemplary embodiment of the invention.

After the method starts (step 601), the speech recognition application in the framework of which the speech recognition is to be carried out is selected or determined (step 602).

According to this exemplary embodiment, the following speech recognition applications are provided as possible applications for speech recognition:

a speech dialogue system:
    a speech recognition rate of 92–93% is to be ensured for a speech dialogue system;

a vehicle navigation system:
    a speech recognition rate of approximately 95% is to be ensured for this speech recognition application;

a control of a technical system, according to the exemplary embodiment of a video recorder:
    for this speech recognition application a speech recognition of approximately 95% is to be ensured;

a telephone application:
    for this application a speech recognition rate of 95% is to be ensured;

dictation, in other words the recognition of speech information and conversion of the recognized speech signal into a text processing system:
    for this application the maximum speech recognition rate which can be achieved with the speech recognition system is necessary, that is to say in this case it is not appropriate to reduce feature vector components.

For the respective speech recognition application, segmentation of the super feature vectors (step 603) is carried out in the same way as described above, with a training data record which is also stored in the second memory area 202 and is preferably dependent on the speech recognition application.

Then, an LDA calculation is also carried out (step 604), likewise in the same way described above, by which means an LDA matrix 605 which is dependent on the speech recognition application is determined.

Using the LDA matrix 605 which is dependent on the speech recognition application, a pseudo-entropy mapping which is dependent on the speech recognition application and which represents a relationship between the pseudo-entropy which can be achieved and the number of feature vector components respectively taken into account in each feature vector is determined.

The respective pseudo-entropy mapping which is dependent on the speech recognition application is stored in the sixth memory area 206.

The necessary pseudo-entropy is determined (step 606) using the previously determined, required speech recognition rate and the recognition rate information which is stored in the sixth memory area 206 for the selected application in an additional step.

Using the pseudo-entropy mapping—in the form in which it has previously been determined—which is dependent on the speech recognition application, it is determined in a subsequent step (step 607), how many feature vector components and which feature vector components, according to this exemplary embodiment the feature vector components which respectively have the smallest information content, can be omitted, in other words may not be taken into account, from the framework of the speech recognition.

If the number of required feature vector components for the selected application is then determined in step 607, in a following step clustering is carried out (step 608) for the respective application and for the specific number of feature vector components. The result of the clustering is a code book 609 which is dependent on the speech recognition application, in other words a set of trained Hidden Markov Models which are dependent on the speech recognition application and which are also stored in the memory. The cluster method is equivalent to the cluster method described above (step 405) for determining the recognition rate information 500.

Then, the speaker-independent speech recognition is carried out using the stored code book 609 which is dependent an the speech recognition application (step 610).

In other words this means that a subsequently spoken utterance of a user is carried out using the Hidden Markov Models according to the method described in [1] for speaker-independent speech recognition using the Viterbi algorithm (step 610).

As described previously, within the framework of the speech recognition, the reduced feature vectors are taken into account, that is to say the feature vectors without the feature vector components which are not taken into account.

In other words this means that in the case of k feature vector components in a feature vector and n feature vector components (n<k) which are not taken into account, only (k−n) feature vector components have to be taken into account within the scope of the speech recognition.

The comparison thus also takes place in a comparison space with the dimension (k−n).

In addition, according to the invention the recognition rate information is determined only once; for each new speech recognition application all that is necessary is to determine, using the recognition rate information 500, how many, and preferably which, feature vector components are necessary for the new speech recognition application, and to determine the code book for the determined number of required feature vector components.

FIG. 5 shows the example in which a speech recognition rate of 95% is required for the selected application, represented in FIG. 5 by means of an intersection line 504.

Data points located above the intersection line represent a pseudo-entropy which is greater than would actually be necessary for the requirement of the selected application, in other words in order to ensure a recognition rate of 95%.

According to this exemplary embodiment, two feature vector components may be omitted, as a result of which it was possible to reduce the dimension of the processed feature vectors by the value 2.

It is clear that the invention can be considered to comprise the fact that, under certain conditions, a lower recognition rate of the speech recognizer can be accepted for a specific selected speech recognition application, for example from the Command and Control area, and the invention implements this recognition as a reduction of the dimension of the processed feature vector.

After speech recognition has taken place in step 610, the method is terminated (step 611).

The invention claimed is:

1. A method for computer-supported speech recognition using feature vectors, a detection rate information being stored, said detection rate information indicating for the feature vectors as function of the information content of the feature vector components, which speech recognition rate can be respectively achieved with the feature vectors with the feature vector components which are respectively taken into account, comprising:
   determining the speech recognition rate which is required for a speech recognition application;
   determining using the recognition rate information, the information content of the feature vector components which is at least necessary to ensure the specific speech recognition rate;
   determining the number of feature vector components which are necessary in the speech recognition system for the speech recognition application in order to make available the determined information content; and
   carrying out the speech recognition using feature vectors with the number of feature vector components which are necessary to make available the determined information content.

2. The method as claimed in claim 1, further comprising using a speaker-independent speech recognition method for the speech recognition.

3. The method as claimed in claim 2, further comprising carrying out the speech recognition using Hidden Markov Models.

4. The method as claimed in one of claims 1 to 3, further comprising selecting and using the feature vector components with the largest information content within the scope of the speech recognition.

5. A speech recognition system comprising
   a speech recognition unit;
   an electronic dictionary which is connected to the speech recognition unit and in which the words which are taken into account in the framework of the speech recognition are stored;
   a recognition rate information store in which recognition rate information is stored, said information indicating for the feature vectors, as a function of the information content of the feature vector components, which speech recognition rate can be respectively achieved with the feature vectors with the feature vector components which are respectively taken into account;
   a recognition rate information-determining unit for determining the recognition rate information;
   an information content-determining unit for determining the information content for feature vector components of a feature vector in the speech recognition system; and
   a feature vector component selection unit for selecting feature vector components which are to be taken into account within the framework of the speech recognition.

6. The speech recognition system as claimed in claim 5, in which the speech recognition unit is designed for speaker-independent speech recognition.

7. The speech recognition system as claimed in claims 5 or 6, designed as an embedded system.

8. A control device for controlling a technical system having a speech recognition system as claimed in claim 5, the control instructions which are provided for controlling the technical system being stored in the electronic dictionary.

9. A telecommunications device having a control unit as claimed in claim 8 for controlling the technical system being stored in the electronic dictionary.

* * * * *